No. 728,009. PATENTED MAY 12, 1903.
G. H. RAFLOVICH.
TIRE.
APPLICATION FILED NOV. 3, 1902.
NO MODEL.

Witnesses:
Fred S. Greenleaf
W. C. Lunsford

Inventor.
Gus H. Raflovich,
by Charles Gregory,
atty

No. 728,009. Patented May 12, 1903.

UNITED STATES PATENT OFFICE.

GUS H. RAFLOVICH, OF BOSTON, MASSACHUSETTS.

TIRE.

SPECIFICATION forming part of Letters Patent No. 728,009, dated May 12, 1903.

Application filed November 3, 1902. Serial No. 129,863. (No model.)

*To all whom it may concern:*

Be it known that I, GUS H. RAFLOVICH, a citizen of the United States, residing at Boston, in the county of Suffolk and State of Massachusetts, have invented an Improvement in Tires, of which the following description, in connection with the accompanying drawings, is a specification, like characters on the drawings representing like parts.

It is the object of my present invention to provide a novel tire for bicycles, motor-vehicles, &c., which is constructed in such a way as to obtain the resilient qualities of a pneumatic tire without the necessity of using compressed air for keeping the tire in shape.

In accordance with my invention I construct the tire with a central chambered core of some resilient material, such as rubber, and wrap spirally about the same strips of fabric or similar material, a part of the strips being wrapped in a right-hand spiral direction and the remainder in a left-hand direction, and I also employ a plurality of binders which extend lengthwise of the tire and which are situated on either side of the tread-face thereof. I will also preferably use a longitudinally-extending filling-strip of strengthening material which lies outside of the spiral wrappings and along the tread of the tire. By this special combination of chambered core, spiral wrappings, longitudinally-extending binders, and strengthening-strip I obtain a tire which has the requisite resiliency for easy riding and yet which is constructed to resist being distorted either transversely or longitudinally.

Figure 1:
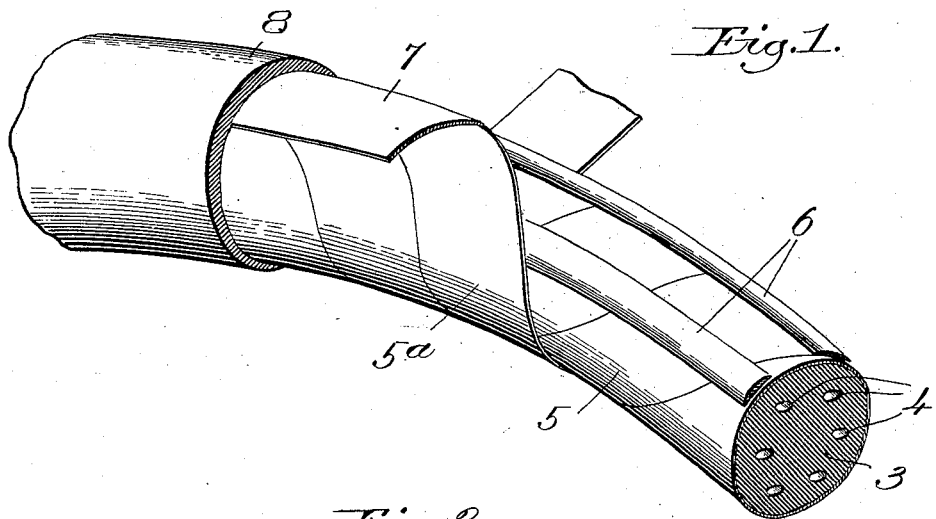
Figure 2:
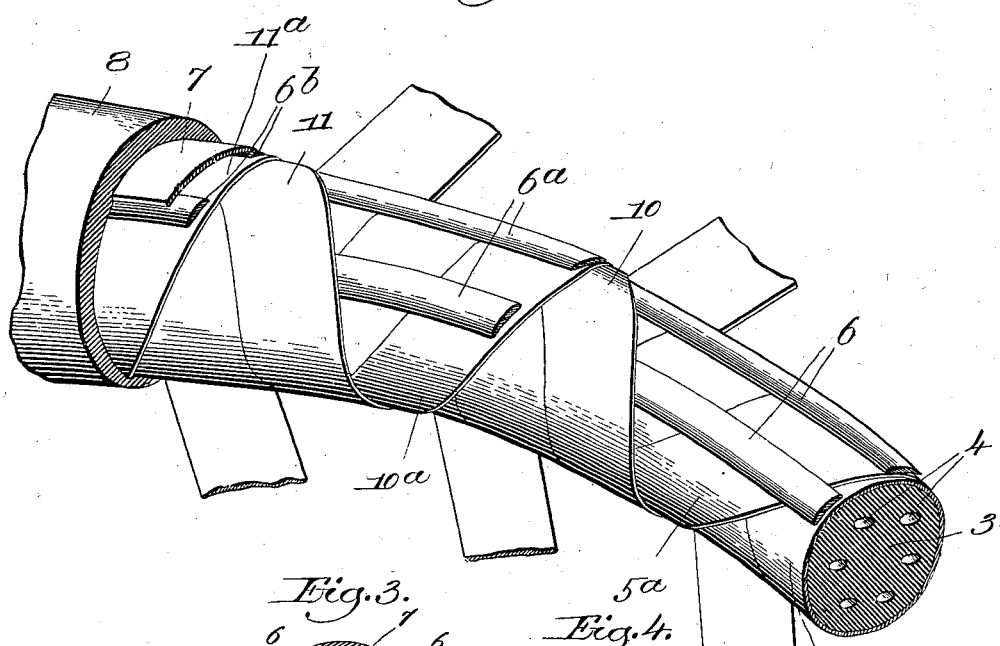
Figure 3:
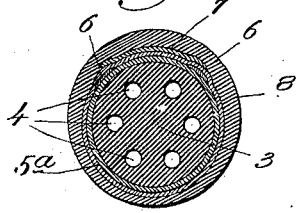
Figure 4:
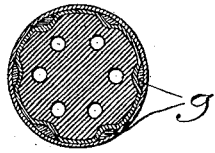

In the drawings, Figure 1 shows in perspective a portion of one form of my tire, parts thereof being removed to better show the interior construction. Fig. 2 is a similar view of a modified form of tire. Fig. 3 is a cross-section of the tire shown in Fig. 1, and Fig. 4 is a modification.

3 indicates the core of the tire, which is provided with the chambers 4, thereby making it a chambered core. These chambers preferably extend longitudinally of the core and throughout its entire length. The core will be made of rubber or some similar elastic material. Surrounding the core are a plurality of wrappings, the number of which depends upon the size of the tire.

In a small tire, as shown in Fig. 1, I will employ two such wrappings only. Each wrapping is made by winding spirally about the core a strip of canvas or other similar stout fabric, the strips 5 of one wrapping being wound in a left-hand spiral, and those $5^a$ of the other wrapping being wound in a right-hand spiral, the adjacent coils of each wrapping abutting each other, as plainly seen in the drawings.

The strips 5 and $5^a$ are so cut that the warp of the fabric from which they are cut extends longitudinally of the strip, this being important, as it enables me to wind the strips tightly around the core without danger of their stretching longitudinally, as would be the case if they were cut on the bias.

To prevent lateral distortion of the tire and also longitudinal stretching thereof, I employ a plurality of longitudinally-extending binders 6, which are made from strips of canvas or other suitable material which is substantially non-stretchable. Any number of these binders may be used, and they may be placed in any position circumferentially of the tire; but I have herein shown them as being placed either side of the tread portion of the tire, as seen best in Fig. 3. The said binders may either be placed between the two wrappings or outside thereof, as desired. In the form of my invention shown in Fig. 3 they are placed between the wrappings 5 and $5^a$.

Outside of the wrappings and extending longitudinally of the tire is a strengthening or filling strip 7, of canvas, canvas and rubber, or other stout material, the said filling-strip 7 lying along the tread of the tire, and outside of all is a jacket or covering 8, of rubber.

After the parts have been assembled as described the whole tire is vulcanized to form a substantially integral article, as usual in this class of devices.

The form of my invention shown in Fig. 1 is adapted for the smaller sizes of tires; but in constructing the larger-sized tires the parts are assembled as shown in Fig. 2, the difference between the tires of Figs. 1 and 2 being largely in the number of wrappings and in the number of binders employed. In Fig. 2 the core 3 is chambered and constructed in the same way as the core employed in Fig. 1, and surrounding said core are the spiral wrappings 5 5ᵃ, made by wrapping strips of canvas about the core in the manner already above described. Outside of these are laid two binders 6, as already described with reference to Fig. 1, and outside of the binders are two more wrappings 10 10ᵃ, one being made by winding strips in a right-hand spiral and the other by winding strips in a left-hand spiral. Outside of these second wrappings are two binders 6ᵃ, similar in all respects to the binder 6 and similarly positioned, and outside of these binders are further wrappings made by the two spiral strips 11 and 11ᵃ, one strip being wound in a right-hand direction and the other in a left-hand direction. Outside of the latter wrapping are two more binders 6ᵇ and the filling-strip 7, and inclosing all is the jacket 8.

It will be noted that the filling-strip is of the proper width to fill in the space between binders, and by making it so as to partially overlie each of the binders it serves to tie them together and prevent their spreading.

I have found that a core provided with the chambers 4, as herein shown, is sufficiently resilient to make a very easy-riding vehicle and also has sufficient strength to prevent its being collapsed, for the special arrangement of the chambers 4 allows the core to yield sufficiently to give the tire the resiliency of a pneumatic tire without detracting from its stiffness or strength.

By employing strips 5 having the warp running longitudinally thereof they may be wound upon the core sufficiently tight to hold the latter against any distortion, and when once wound there is practically no liability of their stretching. The binders 6 6ᵃ, &c., serve two purposes—first, to prevent the tire from lateral distortion and also to prevent it from longitudinal distortion or stretch. In the performance of the first function they serve to hold the tire in shape when the strain or weight comes on one side thereof, as when a motor cycle or vehicle is rounding a corner, and in the performance of the second function they prevent stretching of the tire, and thus prevent any tendency of the tire to creep. The filling-strip 7 also performs a plurality of functions—first, it ties together the binders of each pair and prevents them from spreading; second, it fills in the space between the binders, and so preserves the cross-sectional shape of the tire, and, third, it assists the binders in preventing any longitudinal stretching and creeping of the tire.

It is because the binders are positively held in their required position that they are so effective in preventing lateral distortion of the tire, and, while in Figs. 1 and 2 I have shown the outer set of binders as being held in such position by the filling-strip 7, I may on large-size tires provide the core with longitudinal grooves $g$, (see Fig. 4,) which partially receive the binders adjacent the core and serve to hold them properly positioned.

My invention is not limited to any special number of binders, and on the large-size tires I may employ three, four, or any number between any two adjacent wrappers.

The important feature of my invention is the combination of the chambered core, spiral wrappings, and binders, as described.

Having described my invention, what I claim as new, and desire to secure by Letters Patent, is—

1. A tire comprising a chambered core, a right and a left hand spiral wrapping encircling the same, a plurality of longitudinally-extending binders, and a longitudinally-extending strengthening or filling strip outside of the wrappings and on the tread of the tire.

2. A tire comprising a core having a plurality of longitudinally-extending chambers, a right and a left hand spiral wrapping encircling the same, a plurality of longitudinally-extending binders, and a longitudinally-extending strengthening or filling strip outside of the wrappings and on the tread of the tire.

3. A tire comprising a core having a plurality of longitudinally-extending chambers, a plurality of strips of fabric wound spirally thereabout, a portion of said strips being wound in a right-hand direction and the remainder of the strips in the opposite direction, and a plurality of non-metallic binders extending longitudinally of the tire.

4. A tire comprising a chambered core, a plurality of strips of fabric wound spirally thereabout, a portion of said strips being wound in a right-hand direction and the remainder of the strips in the opposite direction, and a plurality of binders extending longitudinally of the tire, said binders being situated either side of the tread portion of the tire.

5. A tire comprising a chambered core, a plurality of strips of woven fabric wound spirally thereabout, said strips having the threads which are interwoven to form the same running longitudinally and transversely thereof, a portion of said strips being wound in a right-hand spiral direction, and the remainder in a left-hand direction, a plurality of longitudinally-extending binders, and a filling-strip on the tread side of the tire, said strip operating to tie the binders together.

6. A tire comprising a chambered core, a plurality of strips of woven fabric wound spirally thereabout, said fabric having the warp-threads thereof extending longitudinally of the strips, a portion of said strips being wound in a right-hand direction and the remainder in a left-hand direction, and a plurality of longitudinally-extending binders, said binders being situated either side of the tread portion of the tire.

7. A tire comprising a core having a plurality of chambers therein, said core being constructed to hold its shape without the aid of internal pressure, a plurality of strips of fabric wound spirally about the core, a portion of said strips being wound in a right-hand direction and the remainder in the opposite direction, and a plurality of binders extending longitudinally of the tire, some of said binders being situated either side of the tread portion of the tire whereby they serve to prevent lateral distortion thereof.

In testimony whereof I have signed my name to this specification in the presence of two subscribing witnesses.

GUS H. RAFLOVICH.

Witnesses:
 LOUIS C. SMITH,
 JOHN C. EDWARDS.